United States Patent
Kong et al.

(10) Patent No.: US 9,242,370 B2
(45) Date of Patent: Jan. 26, 2016

(54) MINIATURE ROBOT HAVING MULTIPLE LEGS USING PIEZO LEGS HAVING TWO DEGREES OF FREEDOM

(71) Applicant: DAEGU GYEONGBUK INSTITUTE OF SCIENCE AND TECHNOLOGY, Daegu (KR)

(72) Inventors: Dong Uck Kong, Daegu (KR); Byung-Rak Son, Daegu (KR); Sang-Jun Moon, Daegu (KR); Dong-Ha Lee, Daegu (KR)

(73) Assignee: DAEGU GYEONGBUK INSTITUTE OF SCIENCE AND TECHNOLOGY, Daegu (KR)

( * ) Notice: Subject to any disclaimer, the term of this patent is extended or adjusted under 35 U.S.C. 154(b) by 0 days.

(21) Appl. No.: 14/358,800

(22) PCT Filed: Nov. 9, 2012

(86) PCT No.: PCT/KR2012/009493
§ 371 (c)(1),
(2) Date: May 16, 2014

(87) PCT Pub. No.: WO2013/073803
PCT Pub. Date: May 23, 2013

(65) Prior Publication Data
US 2014/0305716 A1   Oct. 16, 2014

(30) Foreign Application Priority Data

Nov. 17, 2011   (KR) .................. 10-2011-0120433

(51) Int. Cl.
*B62D 57/02* (2006.01)
*B25J 5/00* (2006.01)
*H02N 2/00* (2006.01)
*B25J 9/16* (2006.01)

(52) U.S. Cl.
CPC .. *B25J 5/00* (2013.01); *B25J 9/161* (2013.01); *B62D 57/02* (2013.01); *H02N 2/0075* (2013.01); *H02N 2/0095* (2013.01); *Y10S 901/01* (2013.01)

(58) Field of Classification Search
CPC .............................. B62D 57/032; B62D 52/02
See application file for complete search history.

(56) References Cited

U.S. PATENT DOCUMENTS

| | | | |
|---|---|---|---|
| 5,136,201 A * | 8/1992 | Culp | 310/328 |
| 7,996,112 B1 * | 8/2011 | Behar et al. | 700/258 |
| 2012/0168233 A1* | 7/2012 | Clark | 180/8.1 |

FOREIGN PATENT DOCUMENTS

| | | |
|---|---|---|
| JP | 2004-268223 A | 9/2004 |
| JP | 2006-062057 A | 3/2006 |
| KR | 10-0402920 B1 | 10/2003 |
| KR | 10-0950708 B1 | 3/2010 |

OTHER PUBLICATIONS

International Search Report for PCT/KR2012/009493 mailed Mar. 26, 2013 from Korean Intellectual Property Office.

* cited by examiner

*Primary Examiner* — Kevin Hurley
(74) *Attorney, Agent, or Firm* — Paratus Law Group, PLLC

(57) ABSTRACT

The present invention relates to a miniature robot using a plurality of piezo legs capable of deforming in two degrees of freedom by supplying input voltage signals, and an integrated artificial neural network behavior controller capable of modeling complex behavioral patterns and gait patterns by a simple structure. The miniature robot with multiple legs includes: a main body; a plurality of piezo legs constituted by bimorph piezoelectric elements and connected to the main body to generate motion through morphological deformation in two degrees of freedom by applied voltage signals, thereby resulting in movement on the ground; and a control part including an artificial neural network behavior controller, which controls motion patterns by feeding back information with respect to the environment transmitted from external sensors and to electrical signals transmitted when the piezo legs contact the surface of the ground, to control the voltage applied to each of the piezo legs.

5 Claims, 3 Drawing Sheets

MINIATURE ROBOT HAVING MULTIPLE LEGS USING PIEZO LEGS HAVING TWO DEGREES OF FREEDOM

CROSS REFERENCE TO PRIOR APPLICATION

This application is a National Stage Patent Application of PCT International Patent Application No. PCT/KR2012/009493 (filed on Nov. 9, 2012) under 35 U.S.C. §371, which claims priority to Korean Patent Application No. 10-2011-0120433 (filed on Nov. 17, 2011) which are all hereby incorporated by reference in their entirety.

TECHNICAL FIELD

The present invention relates to a miniature multi-legged robot, and more particularly, to a miniature multi-legged robot using a plurality of piezo-legs with two motional degrees of freedom. Each piezo-leg is capable of motion by controlled supplying of voltage. An artificial neural network behavior controller models complex behavioral patterns as well as leg-motion patterns through a simple structure.

BACKGROUND ART

Miniature robots usually have limited functions and mission capabilities due to a small-sized control part. Especially when a miniature robot performs tasks as photographing, communication, simple cleaning or coating etc. Simultaneously during movements. Applications in microtubules, blood vessels, internal organs might be representative examples.

As an example of such a miniature robot, Korean Patent No. 0402920 discloses an endoscopic micro robot including a rotational shaft rotated by a drive motor installed in a body, a plurality of legs driven by a plurality of cams having phase differences around the rotational shaft, and a propelling parts for moving the body.

However, the micro robot of the above patent has a significant drawback as the robot is moved by complex mechanical sub-system configuration which hence obtains a limit for miniaturization.

In order to solve this problem, Korean Patent No. 0950708 discloses a miniature robot, in which a piezo actuator is applied to a robot joint and the miniature robot can be driven by transformating a linear motion of the piezo actuator into a rotary motion.

However, since most of simple mechanisms using the piezo of the conventional miniature robot or other principles have one degree of freedom in the up and down direction or the fore and aft direction, it is not easy to perform accurate motion and behavior control an unstructured path. In addition, since a number of power transmission mechanisms are needed to convert a one-degree-of-freedom motion of the piezo into multi-degrees-of-freedom motion, there is still a problem of a complex driving mechanism.

DISCLOSURE

Technical Problem

The present invention is conceived to solve the aforementioned problems. An object of the present invention is to provide a miniature multi-legged robot with a novel driving mechanism and a control structure, capable of realizing efficient motion and locomotion on a plane as well as unstructured path by using a plurality of piezo-legs moving in two degrees of freedom by voltage input signals and controlled by an artificial neural network behavior controller modeling complex behavioral patterns and gait patterns through a simple structure.

Technical Solution

According to one object achievement aspect of the present invention a miniature multi-legged robot using two-degrees-of-freedom piezo-legs is provided, which includes a main body; a plurality of piezo-legs, each of which is made of a bended and twisted bimorph piezoelectric bar and connected to the main body. These legs generate 2-DOF motions caused by morphological deformation, when voltage signals are feeded. The artificial neural network controller generates a suitable behavior and gait pattern for arbitrary ground surface properties. Each output neuron of the artificial neural network controller provides then the required level of the input voltage signal for each leg. The legs can also be applied as piezo electrical sensors to obtain information about the groud surface, so that the signals can be transferred in the opposite direction, i.e. from the ends of the piezo-legs to the input layer of the controller.

According to one embodiment of the present invention, the piezo-legs have a bended and twisted structure. One piezo-leg includes two regions: the first region is a horizontal portion horizontally extending from the main body, mechanically fixed to the main body, and electrically connected to the control part to be supplied with the voltage. The second region is a vertical portion following to the first region, extending in an up and down direction while being twisted by a predetermined angle at the beginning of the horizontal portion, right after the bending from the horizontal region to the vertical region.

According to another embodiment of the present invention, the miniature multi-legged robot of the present invention may further includes external sensors installed in one side of the main body to detect external environments and propagate the signals to the control part. The control part is preferably provided with an artificial neural network behavior controller for controlling a gait pattern according to a required motion pattern by feeding back information about the environments transferred from the external sensors and electrical signals transferred when the ends of the piezo-legs touches the ground surface.

Advantageous Effects

A multi-legged robot according to the present invention moves along a ground surface by two-degrees-of-freedom motion of a plurality of piezo-legs, each of which is manufactured of a bimorph piezoelectric bar. Accordingly, the multi-legged robot can efficiently move not only on the flat floor surface but also on a rough and unstructured path.

Particularly, the multi-legged robot of the present invention can be efficiently and accurately controlled since a behavioral pattern and hence gait motion of the piezo-legs can be simultaneously feedback controlled using an artificial neural network behavior controller capable of modeling complex nonlinear functions by a simple structure.

BEST MODE

Hereinafter, a preferred embodiment of a miniature multi-legged robot according to the present invention will be described in detail with reference to the accompanying drawings.

Figure 1:
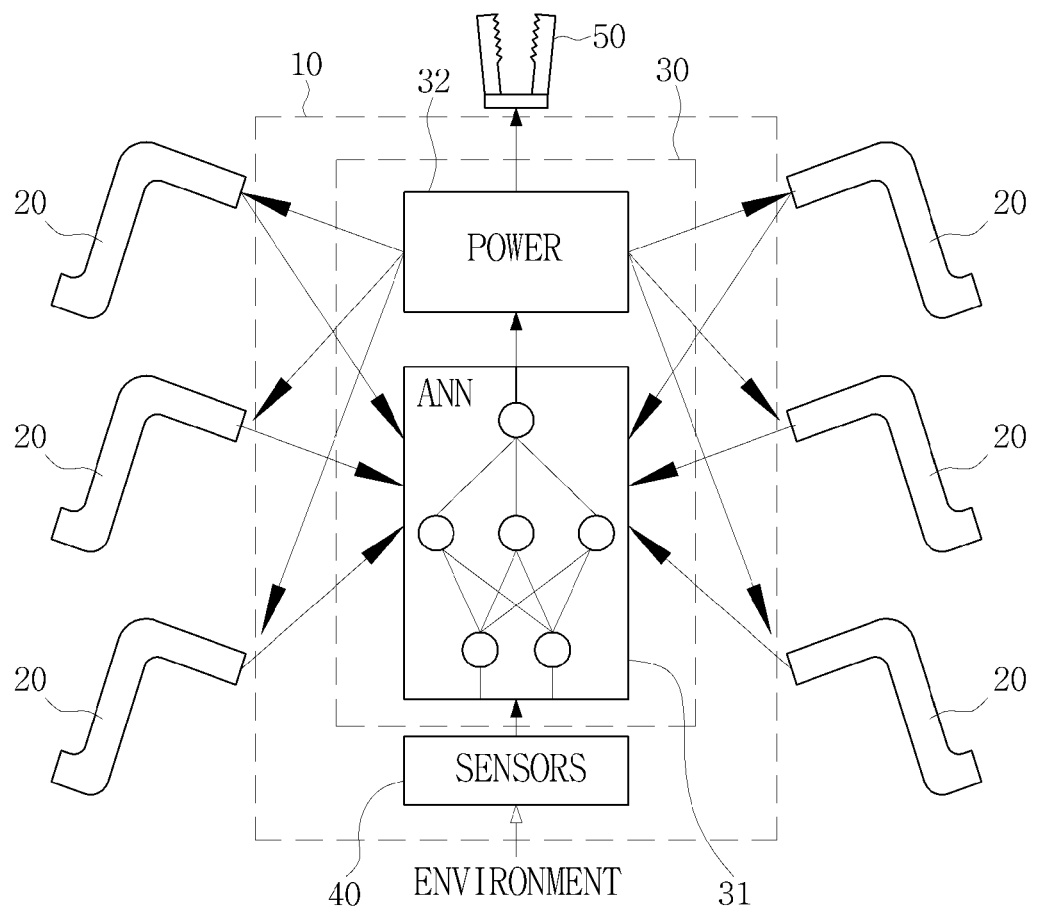
FIG. 1 is a view schematically showing a configuration of a miniature multi-legged robot according to the present invention.
Figure 2:
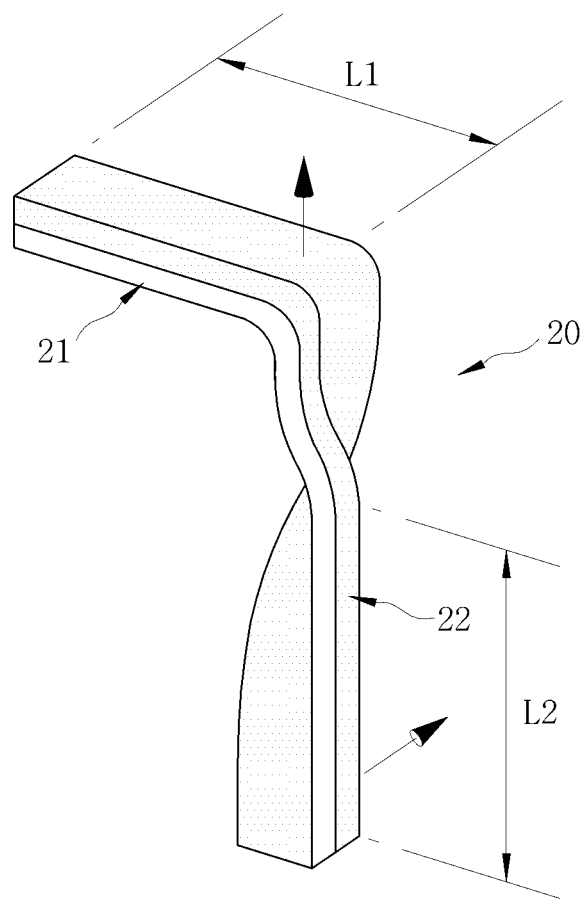
FIG. 2 is a perspective view showing a structure of a piezo-leg of the miniature multi-legged robot of FIG. 1.

FIGS. 1 to 2 show a configuration of a miniature multi-legged robot according to a preferred embodiment of the present invention. First, referring to FIG. 1, the miniature multi-legged robot of the present invention includes a main body 10, a plurality of piezo-legs 20 (six piezo-legs 20 in this embodiment) installed to both sides of the main body 10 and each having two degrees of freedom to generate gait patterns, a piezo gripper 50 installed in a front of the main body 10 to grip an object, and a control part 30 for controlling the level of input voltage signals applied to the respective piezo-legs 20 and the piezo gripper 50.

The piezo-leg 20 consists of bimorph piezoelectric bars formed by stacking a plurality of piezoelectric layers or piezoelectric and metal layers to generate motions through morphological deformation in available degrees of freedom, by the input voltage signals applied from the control part 30.

As shown in FIG. 2, in this embodiment, the piezo-leg 20 includes a horizontal portion 21 horizontally extending from the main body 10 and having an inside end, i.e., an end fixedly connected to the main body 10, electrically connected to the control part 30 to be supplied with voltage, and a vertical portion 22 extending downwards while being twisted 90 degrees after the end of the horizontal portion 21. When the input voltage signal is supplied, the horizontal portion 21 moves in the up and down direction (direction of arrow A), and the vertical portion 22 moves in the fore and aft direction (direction of arrow B). The piezo-legs 20 can realize efficient movements even on a rough terrain through a combination of the up and down direction motion of the horizontal portion 21 and the fore and aft direction motion of the vertical portion 22.

Figure 3:
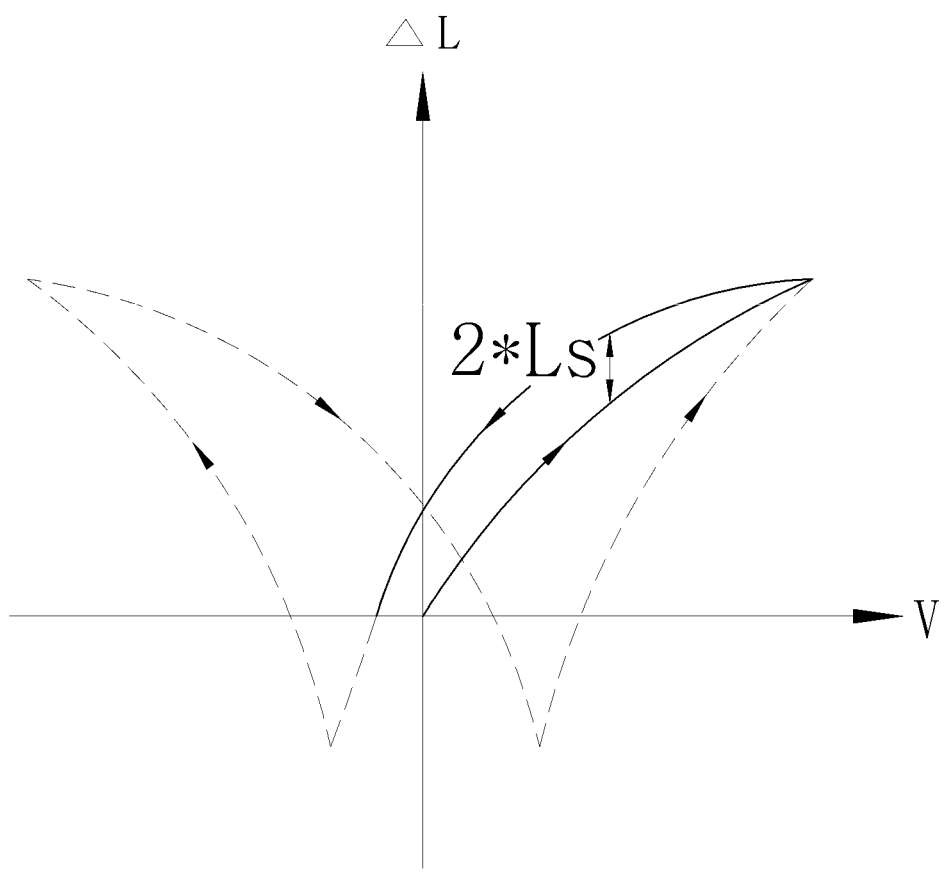
FIG. 3 is a graph showing the principle scheme of deformation depending on voltage signal to a piezoelectric element.

A stride and a height and hence a gait pattern of the piezo-leg 20 can be optimized by setting parameters, such as selection of a suitable piezoelectricity material, optimization of a length $L_1$ of the horizontal portion 21 and a length $L_2$ of the vertical portion 22, generation of a stride $L_S$ using hysteresis of the bimorph piezoelectric element as shown in FIG. 3, and generation of a motion speed difference (swing phase) (supporting phase) within a gait pattern.

The piezo gripper 50 may be configured using the bimorph piezoelectric element in the same manner as the piezo-legs 20 and is in the shape of tongs to perform a function of gripping an object by being deformed by the voltage applied from the control part 30.

In the meantime, external sensors 40 detecting external environments is installed in one side of the main body 10 to be electrically connected to the control part 30.

The control part 30 is provided with an integrated artificial neural network behavior controller 31 for generating and controlling the required gait pattern according to feed-back information about the environments transferred from the external sensors 40 and an electrical signals transferred when the ends of the piezo-legs 20 touches the ground surface. The artificial neural network behavior controller 31 is a controller capable of modeling a complex nonlinear function by a simple structure, both high-level as well as low-level control of the multi-legged robot is performed by the artificial neural network behavior controller 31. A set of input signals for the artificial neural network behavior controller 31 is consists of data of from the external sensors 40 and electrical signals directly transferred from the respective piezo-legs 20, and a set of output signals for the artificial neural network behavior controller consists of commands transferred to a power supply 32 of the control part 30.

As described above, the control part 30 of the present invention controls the voltages supplied from the power supply 32 to the piezo-legs 20 and the piezo gripper 50 through the integrated artificial neural network behavior controller 31 and thereby controls the behavior and gait pattern including gait geometry and motion velocity of each piezo-leg 20, the motion of the piezo gripper 50, etc.

Although the power supply 32 of the control part 30 may include a battery, the power supply 32 may be configured by using new renewable energy such as solar light or solar heat.

A miniature multi-legged robot of the present invention so configured operates as follows.

When a predetermined voltage is applied to each piezo-leg 20 through the power supply 32 of the control part 30, the horizontal portion 21 and the vertical portion 22 of the piezo-leg 20 are deformed and moved in the up and down direction and the fore and aft direction, respectively.

Here, the external sensors 40 detects external environments to transfer them to the artificial neural network behavior controller 31 of the control part 30. Simultaneously, electrical signals depending on pressure caused when the piezo-legs 20 touch a ground surface represents input signals to the artificial neural network behavior controller 31. The artificial neural network behavior controller 31 processes the input signals from the external sensors 40 and the piezo-legs 20 to perceive the environments and determines gait geometry and velocity of each piezo-leg 20 to transfer commands to the power supply 32. The power supply 32 then applies the determined voltage signals to each piezo-leg 20 according to the commands received from the artificial neural network behavior controller 31.

As such a process is repeatedly performed, the multi-legged robot moves to an objective point and performs a predetermined task.

According to the present invention, the multi-legged robot moves on the ground surface by a two-degrees-of-freedom motion of the plurality of piezo-legs 20 each manufactured of the bimorph piezoelectric element. Thus, the multi-legged robot can efficiently move not only on a flat floor surface but also on a rough terrain.

Particularly, the multi-legged robot of the present invention can be accurately controlled since movements of the piezo-legs 20 can be controlled using the artificial neural network behavior controller 31 capable of modeling complex nonlinear functions by a simple structure.

While the technical spirit of the present invention has been described with reference to the accompanying drawings, the preferred embodiment of the present invention is described for illustrative purposes and is not to limit the present invention. In addition, it is apparent to those skilled in the art that various modifications and imitations can be made thereto within the scope of the invention without departing from the technical spirit of the present invention

INDUSTRIAL APPLICABILITY

The present invention can be applied to a small moving apparatus and the like including a miniature robot.

The invention claimed is:

1. A miniature multi-legged robot using two-degrees-of-freedom piezo-legs, comprising:
   a main body;
   a plurality of piezo-legs each made of a bimorph piezoelectric element and connected to the main body to generate a motion through morphological deformation in two degrees of freedom by applied voltage signals, thereby moving on an arbitrary ground surface; and
   a control part for controlling the voltage applied to each piezo-leg,
   wherein the piezo-leg includes a horizontal portion horizontally extending from the main body and having an inside end mechanically mounted to the main body and electrically connected to the control part to be supplied with the input voltage signals, and a vertical portion extending in an up and down direction while being twisted a predetermined angle at the outside end of the horizontal portion.

2. The miniature multi-legged robot according to claim 1, wherein the vertical portion is twisted about 90 degrees at the outside end of the horizontal portion.

3. The miniature multi-legged robot according to claim 1, further comprising external sensors installed in one side of the main body to detect external environments and transfer them to the control part.

4. The miniature multi-legged robot according to claim 3, wherein the control part is provided with an artificial neural network behavior controller for controlling a movement pattern by feed-back information of the environment transferred from the external sensors and electrical signals transferred when the end of the piezo-leg touches the ground surface.

5. The miniature multi-legged robot according to claim 1, further comprising a piezo gripper installed in one side of the main body and made of a piezoelectric material morphologically deformed by being supplied with voltage from the control part thereby gripping an object.

* * * * *